United States Patent [19]

Wojtowicz et al.

[11] E Re. 31,348

[45] Reissued Aug. 16, 1983

[54] HYPOCHLOROUS ACID PROCESS USING SWEEP REACTOR

[75] Inventors: John A. Wojtowicz; Andrew J. Klanica, both of Cheshire, Conn.

[73] Assignee: Olin Corporation, New Haven, Conn.

[21] Appl. No.: 297,386

[22] Filed: Aug. 28, 1981

Related U.S. Patent Documents

Reissue of:

[64] Patent No.: 4,147,761
Issued: Apr. 3, 1979
Appl. No.: 884,950
Filed: Mar. 9, 1978

[51] Int. Cl.[3] ..... C01B 11/04; C01B 11/06

[52] U.S. Cl. ..... 423/473; 423/474

[58] Field of Search ..... 423/473, 474, 240, 241, 423/659, 499; 23/285; 261/119, 112, 115

[56] References Cited

U.S. PATENT DOCUMENTS

| | | | |
|---|---|---|---|
| 1,481,106 | 1/1924 | MacMahon | 423/474 |
| 1,609,758 | 12/1926 | MacMahon | 423/474 |
| 1,619,430 | 3/1927 | Mauran | 423/474 |
| 1,718,285 | 6/1929 | George | 423/474 |
| 2,273,723 | 2/1942 | Muskat | 423/241 |
| 3,585,786 | 6/1971 | Hardison | 261/112 |

FOREIGN PATENT DOCUMENTS

| | | | |
|---|---|---|---|
| 543944 | 3/1942 | United Kingdom | 423/473 |

*Primary Examiner*—Brian E. Hearn
*Attorney, Agent, or Firm*—Arthur E. Oaks; Donald F. Clements

[57] ABSTRACT

A process for preparing hypochlorous acid in a sweep reactor is described in which gaseous chlorine is passed rapidly across the surface of an agitated aqueous solution of [alkali metal] *sodium* hydroxide at a reduced temperature. The resulting gaseous product mixture of hypochlorous acid, chlorine monoxide, and unreacted chlorine is conveyed from the reactor to a suitable scrubber to produce an aqueous hypochlorous acid solution.

The aqueous reaction product of the sweep reactor is a suspension of [alkali metal] *sodium* chloride in [alkali metal] *sodium* hypochlorite, which is withdrawn and filtered to separate the solid. The clarified aqueous solution of [alkali metal] *sodium* hypochlorite is reacted with the aqueous hypochlorous acid solution from the scrubber, chlorine and lime to form an aqueous slurry of calcium hypochlorite. This slurry may be granulated by the spray graining technique, for example, to produce strong rounded granules of calcium hypochlorite.

15 Claims, No Drawings

HYPOCHLOROUS ACID PROCESS USING SWEEP REACTOR

Matter enclosed in heavy brackets [ ] appears in the original patent but forms no part of this reissue specification; matter printed in italics indicates the additions made by reissue.

This invention relates to the preparation of hypochlorous acid in a sweep reactor, and to the use of the reaction products in the preparation of calcium hypochlorite.

Numerous techniques have been disclosed for the preparation of hypochlorous acid, which is used extensively in the preparation of chlorohydrin and chloramines.

One technique for preparing hypochlorous acid is described in British Pat. No. 543,944, which issued Mar. 20, 1942. In this process, chlorine, steam and air are bubbled through an aqueous solution of an alkaline earth metal hypochlorite such as calcium hypochlorite to remove the resulting hypochlorous acid in vapor form, which is then condensed and stored for use. This technique, however, also produces a large volume of calcium chloride, an undesirable by-product.

U.S. Pat. No. 1,403,993, which issued Jan. 17, 1922, to Wallace et al, describes a process in which an excess of aqueous caustic solution is used to scrub chlorine gas. The available chlorine content of such solutions is only about 5 percent and any hypochlorous acid which may form is converted to sodium hypochlorite.

U.S. Pat. No. 1,748,897, which issued to Oppe on Feb. 25, 1930, describes a process for preparing a solid mixture of alkali metal hypochlorite and alkali metal chloride by reacting chlorine gas with a finely divided mist of alkali metal hydroxide, while cooling the reactants and product to below room temperature. One product of this technique is a solid mixture of alkali metal hypochlorite and alkali metal chloride, which has very limited utility.

A batch process for the preparation of sodium hypochlorite is disclosed in U.S. Pat. No. 1,850,975 which issued Mar. 22, 1932, to J. C. Baker. In this process, a measured quantity of aqueous sodium hydroxide solution is prepared and a measured quantity of chlorine gas is then slowly dispersed in the solution to produce an aqueous sodium hypochlorite solution.

Although all of these processes react gaseous chlorine with an alkaline hydroxide solution, none of them produce a stable hypochlorous acid product economically.

U.S. Pat. No. 1,718,285 discloses a process for preparing calcium hypochlorite in which an aqueous slurry of lime and sodium hydroxide is chlorinated to produce a calcium hypochlorite slurry. In one embodiment of this invention, a concentrated solution of caustic soda is chlorinated to precipitate salt, the resulting salt is separated and the clarified aqueous solution of sodium hypochlorite is reacted with chlorine and lime to produce an aqueous slurry of calcium hypochlorite.

There is a need in the industry for an improved process for preparing hypochlorous acid and for utilizing such a technique in the preparation of calcium hypochlorite.

It is a primary object of this invention to provide an improved process for preparing hypochlorous acid of improved stability directly from gaseous chlorine.

A further object of the invention is to provide an improved process for preparing calcium hypochlorite from chlorine, sodium hydroxide and lime.

Still another object of the invention is to provide a process for preparing calcium hypochlorite in which sodium chloride is separated from the system without being contaminated with calcium hypochlorite products.

These and other objects of the invention are accomplished in a process in which gaseous chlorine is passed rapidly over the surface of an agitated concentrated aqueous solution of [an alkali metal] *sodium* hydroxide at a reduced temperature, preferably in a sweep reactor. The resulting gaseous phase, which contains unreacted chlorine, hypochlorous acid, and chlorine monoxide is conveyed from the reactor to an aqueous scrubber and scrubbed with water. The reaction product of suspended particles of [alkali metal] *sodium* chloride in an aqueous solution of [alkali metal] *sodium* hypochlorite is withdrawn from the reactor and filtered to recover solid [alkali metal] *sodium* chloride. The resulting clarified aqueous solution of [alkali metal] *sodium* hypochlorite is reacted with aqueous hypochlorous acid solution from the scrubber, additional caustic, lime and chlorine to form an aqueous slurry of calcium hypochlorite. This slurry is further processed, for example, by the spray graining technique to produce strong rounded granules of calcium hypochlorite. These granules contain a relatively high concentration of available chlorine and resist degradation when subjected to severe handling conditions.

More in detail, the reaction is carried out in a suitable sweep reactor provided with means for agitating a concentrated aqueous solution of [an alkali metal] *sodium* hydroxide, means for rapidly sweeping gaseous chlorine in contact with the surface of the solution of the [alkali metal] *sodium* hydroxide, and means for withdrawing the resulting gaseous reaction product and liquid reaction product. The reactor is also provided with refrigeration means for maintaining the reactor contents at a temperature below about 50° C.

[Any alkali metal hydroxide capable of reacting with gaseous chlorine to form hypochlorous acid is employed as a reactant in the process of this invention. Typical examples of suitable alkali metal hydroxide include sodium hydroxide, potassium hydroxide, lithium hydroxide and mixtures thereof. Sodium hydroxide is the preferred reactant since the resulting sodium chloride by-product is more easily disposed of than the other alkali metal chlorides.]

It is preferable to employ the highest concentration of [alkali metal] *sodium* hydroxide possible to obtain the maximum yield of hypochlorous acid from a reaction medium capable of agitation. Generally, the concentration of [alkali metal] *sodium* hydroxide ranges from about 10 to about 80 and preferably from about 40 to about 70 percent by weight. More dilute or more concentrated solutions or slurries may be employed, if desired.

Sufficient [alkali metal] *sodium* hydroxide solution is placed in the reactor to provide sufficient free space in the reactor and to permit agitation of the resulting reaction slurry and rapid removal of the gaseous product.

The rate of feed of the chlorine gas to the reactor is preferably maintained as high as possible in order to sweep the hypochlorous acid and chlorine monoxide gaseous products from the surface of the [alkali metal]

*sodium* hydroxide solution as soon as these reaction products are formed. Generally, the chlorine feed rate is sufficient to provide a residence time of chlorine in the reactor free space from about 0.01 to about 5 minutes and preferably from about 0.1 to about 1 minute. If desired, the chlorine gas reactant may be admixed with an inert gas such as air, nitrogen, or the like. The chlorine concentration may range from about 0.1 to about 100 percent and preferably from about 40 to about 100 percent by volume. When mixtures of chlorine and inert gas are employed as a reactant, the feed rate of the gas mixture is within the above defined ranges.

Agitation of the [alkali metal] *sodium* hydroxide solution during the reaction is necessary to obtain adequate yields of hypochlorous acid and chlorine monoxide. The agitation should be sufficient to continuously expose new surface of the [alkali metal] *sodium* hydroxide to the chlorine gas. However, it should not be violent enough to effect excessive adsorption of the chlorine gas and gaseous products into the resulting aqueous slurry of [alkali metal] *sodium* hypochlorite. Baffles may be used, if desired.

The feed rate of chlorine gas is kept sufficiently high to maintain excess chlorine in the exit gases. Generally, the rate of chlorine feed is sufficient to permit the conversion of from about 1 to about 75 percent and preferably from about 1 to about 35 percent of the chlorine initially fed per pass to the reactor. When more than about 75 percent of the chlorine is converted in the reactor, there is a tendency for the hypochlorous acid to be adsorbed in the aqueous [alkali metal] *sodium* hypochlorite product thereby markedly reducing the yield of the desired hypochlorous acid product.

Generally, an agitator comprised of a motor or air driven vertical shaft with blades secured to the bottom thereof is employed to provide agitation. However, if desired, side entry agitators positioned in the walls of the reactor may also be employed. In another embodiment, a plurality of blades may be positioned along the central agitator shaft.

If desired, the gaseous chlorine reactant may be released through a suitable tube or tubes below the surface of the [alkali metal] *sodium* hydroxide solution. When this is done, it is important that relatively large bubbles of chlorine gas be formed, to minimize the adsorption of chlorine and hypochlorous acid in the [alkali metal] *sodium* hydroxide solution. In addition, the chlorine gas feed tube should not be placed too far below the surface to avoid excessive adsorption of the chlorine gas in the aqueous reaction media. One disadvantage of this embodiment, is that the [alkali metal] *sodium* chloride solids tend to build up on the feed tube entry and may eventually clog it, thereby requiring that the reactor be shut down for cleaning.

Instead of a sweep reactor of the type described above, other reactor forms may be employed in carrying out the process of this invention. For example, a reactor having a horizontal rotating drum with the lower half of the drum positioned in the aqueous [alkali metal] *sodium* hydroxide solution and the upper half in contact with a flowing stream of gas may also be employed as a reactor. If desired, a falling film reactor or a wiped film reactor in which the aqueous [alkali metal] *sodium* hydroxide solution is conveyed by the wiper in either an upwardly or downwardly direction may be employed.

The reactor is provided with refrigeration means, either external or internal, which maintains the temperature in the reactor sufficiently to minimize decomposition of the [alkali metal] *sodium* hypochlorite product as it is formed. Generally, the temperature of the reaction is in the range from about 0° to about 50° C., and preferably is in the range from about 5° to about 20° C. If the temperature is too low, the [alkali metal] *sodium* hydroxide will freeze and not react, and if it is too high, the [alkali metal] *sodium* hypochlorite product will decompose at an undesirable rate.

The pressure in the reactor is maintained above the remainder of the system in order to provide sufficient pressure to rapidly convey vaporized hypochlorous acid from the reactor to a suitable scrubber which is capable of forming an aqueous solution of hypochlorous acid. Generally, the pressure in the reactor ranges from about 5 to about 100 psia, and preferably from about 10 to about 20 psia.

The hypochlorous acid vapors containing chlorine monoxide are withdrawn from the reactor as they are formed. These vapors are conveyed to a suitable scrubber where they are placed in countercurrent flow with water or other aqueous scrubbing solution to produce an aqueous hypochlorous acid solution containing from about 0.1 to about 12 and preferably from about 1 to about 7 molar hypochlorous acid. If desired, an inert organic solvent, such as carbon tetrachloride, may be employed, but the solvent handling costs may adversely affect the process economics. The gaseous phase discharged from the top of the scrubber contains unreacted chlorine, which may be recycled to the sweep reactor for producing hypochlorous acid. The temperature of the scrubbing stage is generally maintained in the range from about 0° to about 30° C., and preferably from about 10° to about 15° C. At temperatures below about 9.6° C., there is a tendency for chlorine to form chlorine octahydrate which is insoluble in cold water and precipitates in the scrubber, which diminishes the proportion of recycled chlorine. Any convenient pressure may be employed in the scrubber, but a pressure less than the rector pressure is required in order to provide sufficient pressure differential to convey the hypochlorous acid vapors from the reactor to the scrubber. If desired, two or more stages may be employed in the scrubbing operation, wherein the gaseous discharge from the first scrubber is conveyed to the bottom of a second scrubber for scrubbing with fresh solution. The enriched scrubber liquor discharged from the second scrubber is used as the scrubbing medium fed to the top of the first scrubber for scrubbing the hypochlorous acid vapors fed to the bottom of the first scrubber.

Gaseous chlorine is swept across the surface of the [alkali metal] *sodium* hydroxide solution in the sweep reactor until substantially complete conversion of the [alkali metal] *sodium* hydroxide component is achieved. For example, the reaction is substantially complete when from about 90to about 100 percent, and preferably from about 95 to about 99 percent of the [alkali metal] *sodium* hydroxide has been reacted. This condition can be determined by an appropriate pH measurement of the aqueous solution of the resulting slurry. For example, when the pH of the aqueous reaction product is reduced to about 10, and preferably to about 13, the reaction is generally substantially complete. Complete reaction of the [alkali metal] *sodium* hydroxide, for example, to a pH below about 10, should be avoided because the stability of the resulting aqueous [alkali metal] *sodium* hypochlorite solution is adversely affected. If desired the extent of completion can be determined by conventional wet analytical techniques. During the reaction, in addition to gaseous hypochlorous acid and chlorine monoxide, the [alkali metal] *sodium* hydroxide has reacted to form [alkali metal] *sodium* hypochlorite, [alkali metal] *sodium* chloride, along with some by-product [alkali metal] *sodium* chlorate. When the desired extent of completion is obtained, the reaction is stopped and the resulting aqueous slurry of [alkali metal] *sodium* chloride is conveyed to a suitable solid-liquid separation step such as filtration, decantation or the like to separate solid [alkali metal] *sodium* chloride from the aqueous [alkali metal] *sodium* hypochlorite solution. The recovered solid [alkali metal] *sodium* chloride may be employed in the preparation of aqueous brine solution used in electrolytic techniques for preparing chlorine and [alkali metal] *sodium* hydroxide.

The aqueous hypochlorous acid produced by the process of this invention may be used in conventional reactions such as the preparation of chlorohydrin and chloramines. It is especially useful in the preparation of calcium hypochlorite by an improved process. In this process for preparing calcium hypochlorite, the aqueous hypochlorous acid from the bottom of the first scrubber is reacted with finely divided lime under ambient conditions to produce a slurry comprised of a calcium hypochlorite solution containing insoluble impurities derived from the lime. Sufficient hypochlorous acid is employed to effect the formation of calcium hypochlorite in accordance with Equation 1.

$$2HCl + Ca(OH)_2 \rightarrow Ca(OCl)_2 + 2H_2O \quad (1)$$

Hypochlorous acid equivalent to the stoichiometric proportion is preferably employed, but lesser quantities may be employed, if desired.

The pH of the lime-hypochlorous acid reaction is generally maintained within the range from about 9.5 to about 12.5 and preferably from about 10 to about 12. The temperature and pressure for this reaction are generally maintained near ambient conditions.

The resulting slurry is then filtered or otherwise processed to remove the insoluble muds which are primarily iron, aluminum, silicon, and magnesium-containing impurities from the lime. The resulting clarified solution of calcium hypochlorite is then conveyed to a suitable chlorinator where it is reacted with additional lime, the clarified [alkali metal] *sodium* hypochlorite solution and chlorine. However, if the raw lime is relatively pure, the preliminary reaction between lime and hypochlorous acid to remove insolubles can be omitted entirely or in part. If no lime purification step is employed, calcium hypochlorite is prepared by reacting the hypochlorous acid solution from the scrubber, the clarified [alkali metal] *sodium* hypochlorite solution from the reactor with lime and chlorine.

The proportions of reactants and the reaction conditions necessary to effect the preparation of an aqueous slurry of calcium hypochlorite in this reaction are disclosed in U.S. Pat. No. 3,895,099, which issued July 15, 1975, to W. J. Sakowski. This patent is incorporated by reference in its entirety in this application to illustrate typical reaction conditions which may be employed in the preparation of calcium hypochlorite in the process of this invention. The reactions which occur in the preparation of calcium hypochlorite by this technique are illustrated by the following equations:

$$Ca(OH)_2 + Cl_2 \rightarrow \tfrac{1}{2}Ca(ClO)_2 \cdot H_2O + \tfrac{1}{2}CaCl_2 \quad (2)$$

$$2NaOH + Cl_2 \rightarrow NaClO + NaCl + H_2O \quad (3)$$

$$NaClO + \tfrac{1}{2}CaCl_2 \rightarrow \tfrac{1}{2}Ca(ClO)_2 + NaCl \quad (4)$$

The resulting aqueous calcium hypochlorite slurry is further treated to recover the calcium hypochlorite product in dry granular form. One embodiment of this invention employs a spray dryer of the type described in U.S. Pat. No. 2,901,435, which issued Aug. 25, 1959, to H. L. Robson which is hereby incorporated by reference. An aqueous slurry of calcium hypochlorite is fed to a spray drying chamber and the resulting droplets are contacted with hot inert gas such as air. The slurry droplets are dried in the chamber by means of the heated gas having an inlet temperature in the range from about 200° to about 235° C. and an outlet temperature in the range from about 70° to about 95° C.

In another embodiment of the invention, the concentration of the aqueous calcium hypochlorite slurry is adjusted by evaporation or otherwise to a water content of from about 45 to about 90, and preferably from about 50 to about 60 percent by weight of water. The resulting aqueous calcium hypochlorite slurry is conveyed to a rotary spray grainer or a fluidized bed spray grainer of the type described in U.S. Pat. No. 3,969,546, which issued July 13, 1976, to W. C. Saeman which is hereby incorporated by reference in its entirety. In this technique, strong rounded granules of calcium hypochlorite are prepared which resist degradation and dusting when subjected to severe handling conditions.

The granular calcium hypochlorite product of either the spray drying technique or the spray graining technique is further dried, if desired, in a conventional rotating dryer to produce a granular calcium hypochlorite product having a water content ranging from about 0.1 to about 15 and preferably from about 1 to about 12 percent by weight.

A unique feature of the process of this invention is that chlorine reacts on the liquid [alkali metal] *sodium* hydroxide surface to form a gaseous mixture of hypochlorous acid and chlorine monoxide, and this gas is rapidly swept out of the reactor and collected in the scrubber as soon as it is formed. Another improved result in the process for preparing calcium hypochlorite by this technique is that [alkali metal] *sodium* chloride, a by-product of conventional calcium hypochlorite processes, is separated from the system prior to the formation of calcium hypochlorite, and as a result, there is no loss of the desired calcium hypochlorite product as a contaminant when separating the solid [alkali metal] *sodium* chloride.

It has been found that as the stirring rate of the [alkali metal] *sodium* hydroxide solution is increased, the chlorine conversion increases. In addition, the yield of hypochlorous acid varies inversely with the chlorine conversion and directly with the initial [alkali metal] *sodium* hydroxide concentration. As the reaction progresses, the yield of hypochlorous acid decreases as the concentration of [alkali metal] *sodium* hydroxide decreases.

The following examples are presented to define the invention more fully without any intention of being limited thereby. All parts and percentages are by weight unless otherwise specified.

EXAMPLE 1

A slurry of 60 percent NaOH (268 g, 4.021 mol) was charged into a 4-neck, 300-ml round bottom flask fitted with a chlorine inlet, thermometer, stirrer and pH probe. While maintaining a temperature of 5° C., a 50.8 percent by volume mixture of chlorine in nitrogen was passed over the surface of the caustic at a total flow rate of 1.117 liters per minute for 679 minutes. The caustic solution was stirred for 560 minutes at 200 revolutions per minute followed by 119 minutes at 400 revolutions per minute, for the average of 235 revolutions per minute. The exit gases were passed through two water scrubbers (at 10° C.) in series to absorb the HOCl and $Cl_2O$, and then through a caustic scrubber to absorb excess chlorine. Analysis of the scrubber solutions and the reactor contents showed conversion of chlorine and NaOH of 17.8 and 99.0 percent, respectively. The selectivities (corrected yields) of HOCl and NaOCl were 41.0 and 37.3 percent, respectively. These data are summarized in Table 1.

EXAMPLE 2

The procedure of Example 1 was repeated using the reaction conditions, reactant quantities and product selectivities given in Table 1. Eighty-seven percent of the HOCl produced was absorbed in the first scrubber giving 395.2 g of 14.2 percent HOCl solution. The reactor contents were warmed to 25° C. and filtered giving 183.5 g of 28.5 percent NaOCl solution. The HOCl solution from the first scrubber and the NaOCl filtrate were used to prepare $Ca(OCl)_2$ as described in Example 4. The filter cake (salt) was washed with three 25-ml portions of water giving 102.5 g of 12.6 percent NaOCl solution. This dilute NaOCl solution was recycled to the caustic chlorinator. The salt cake weighed 170.4 g and contained 83.94 percent NaCl and 2.76 percent NaOCl.

EXAMPLE 3

Using the conditions set forth in Table 1 for a period of 930 minutes, this example showed a caustic conversion of 98.2 percent and a chlorine conversion of 12.8 percent.

EXAMPLES 4–5

Into a 3-neck, one-liter round bottom flask was charged 45 g $H_2O$ and 30 g of hydrated lime. To the well-stirred mixture at 25° C., was slowly added 232.5 g of HOCl solution from Example 2. After adding an additional 23.7 g of hydrated lime, 100 g of NaOCl solution from Example 2 was added and the resultant mixture was chlorinated to a pH of about 10.0. An additional 2.8 g of hydrated lime was added and the reaction slurry was stripped of the majority of water under reduced pressure at 35° to 40° C. The partially dried product was granulated and dried further in a vacuum oven at 35° to 40° C. The dry product weighed 141.3 g and contained 67.9 percent $Ca(OCl)_2$ and 3.0 percent $H_2O$. The results of this example and Example 5, using different quantities of reactants are shown in Table 2.

TABLE 2

PREPARATION OF $Ca(OCl)_2$ BY THE SURFACE SWEEP PROCESS

| Example | Lime[a] | | HOCl Solution | | NaOCl Solution | | $Cl_2$ | Product | % | % |
|---|---|---|---|---|---|---|---|---|---|---|
| No. | g | mol | g | mol | g | mol | mol | g | $Ca(OCl)_2$ | Yield |
| 4 | 56.5 | 0.735 | 232.5[b] | 0.629 | 100.0[b] | 0.383 | 0.38 | 141.3 | 67.9 | 95.9 |
| 5 | 63.0 | 0.820 | 254.3[c] | 0.701 | 120.0[c] | 0.427 | 0.43 | 158.0 | 69.6 | 98.5 |

[a]96.4% $Ca(OH)_2$.
[b]From Example 2.
[c]From Example 3.

EXAMPLE 6

Hypochlorous acid was prepared in accordance with the process of this invention employing a two-stage reactor and a two-stage scrubbing system. The resulting hypochlorous acid solution and clarified sodium hypochlorite solution were used to prepare a slurry of calcium hypochlorite which was formed into granular calcium hypochlorite by a spray graining technique.

In preparing the aqueous hypochlorous acid solution, a 50 percent aqueous sodium hydroxide solution (78.37 parts per hour) was added to the first stage reactor. Fresh gaseous chlorine (23.5 parts per hour) was admixed with recycled gaseous chlorine (55.04 parts per hour) and the resulting mixture was fed to the first stage reactor across the surface of the aqueous caustic solution, while simultaneously agitating the solution.

The temperature of the first stage reactor was maintained by means of an external ice bath at a temperature of about 10° C. The sodium hydroxide solution, diluted with sodium hypochlorite and sodium chloride, was withdrawn from the first stage reactor at the rate of 93.01 parts per hour and conveyed to the second stage reactor where additional fresh chlorine (15.99 parts per hour) was swept across the surface of the solution. A slurry of sodium hypochlorite and sodium chloride was discharged from the second stage reactor at the rate of 127.5 parts per hour and conveyed to a centrifuge

TABLE 1

GENERATION OF HOCl BY THE SURFACES SWEEP PROCESS[(a)]

| Example | Run Time | Reactants (g) | | Temp. | Stirring Rate | Flowrate (ml/min) | | Selectivity (%) | | | Conversion (%) | |
|---|---|---|---|---|---|---|---|---|---|---|---|---|
| No. | min. | $Cl_2$ | NaOH | °C. | rpm | $Cl_2$ | $N_2$ | HOCl | NaOCl | $NaClO_3$ | $Cl_2$ | NaOH |
| 1 | 679 | 1117 | 268 | 5 | 235[(b)] | 567 | 550 | 41.0 | 37.3 | 20.9 | 17.8 | 99.0 |
| 2 | 768 | 1238 | 268 | 4 | 200 | 550 | 550 | 32.5 | 47.7 | 19.8 | 14.8 | 96.8 |
| 3 | 930 | 1471 | 268 | 6 | 220[(c)] | 550 | 550 | 34.8 | 42.3 | 22.9 | 12.8 | 98.2 |

[(a)]60.03% caustic chlorinated in 300 ml reactor fitted with stirrer, thermometer and pH probe.
[(b)]560 min. at 200 rpm followed by 119 min. at 400 rpm.
[(c)]95 min. at 400 rpm followed by 835 min. at 200 rpm.

where solid sodium chloride was separated at the rate of 29.53 parts per hour. The solid salt was washed with water and the wash water was recycled to the second stage reactor. The clarified sodium hypochlorite residue was removed from the centrifuge at the rate of about 97.92 parts per hour. Analysis of the sodium hypochlorite solution was as follows:

| Component | Percent |
|---|---|
| Sodium Hydroxide | 1.86 |
| Water | 64.80 |
| Sodium Chloride | 4.79 |
| Sodium Hypochlorite | 27.95 |
| Sodium Chlorate | 0.60 |

This solution was stored for use in the preparation of calcium hypochlorite.

The gaseous mixture from the top of the first stage reactor, which was comprised of unreacted chlorine, hypochlorous acid and chlorine monoxide, was conveyed to the bottom of a first stage scrubber in a two-stage scrubber system at the rate of 64.44 parts per hour. Water was fed to the top of the second stage scrubber at the rate of 61.86 parts per hours. Scrubbed gas from the top of the first stage scrubber was fed to the bottom of the second stage scrubber at the rate of 55.44 parts per hour. Gaseous discharge from the top of the second stage scrubber, which was essentially unreacted chlorine, was recycled to the first stage reactor at the rate of 55.04 parts per hour. Enriched water from the bottom of the second stage scrubber was conveyed at the rate of 63.01 parts per hour to the top of the first stage scrubber. Both scrubbers were maintained at a temperature of approximately 10° C.

An aqueous solution of hypochlorous acid was discharged from the bottom of a first stage scrubber at the rate of 71.16 parts per hour. This solution containing approximately 12.21 percent of hypochlorous acid, the balance being essentially water, was stored in a holding tank for use in the preparation of calcium hypochlorite.

Calcium hypochlorite slurry was formed by reacting sodium hypochlorite solution prepared as described above (97.92 parts per hour), hypochlorous acid solution prepared as described above (71.16 parts per hour), chlorine (28.25 parts per hour) and finely divided lime containing about 96.5 percent by weight of $Ca(OH)_2$ (36.77 parts per hour) in a lime chlorinator. An aqueous slurry containing about 28.62 percent of calcium hypochlorite, about 12.28 percent of sodium chloride and a number of trace impurities was fed at the rate of 234.09 parts per hour to a rotary horizontal spray grainer. In the spray grainer, the calcium hypochlorite slurry was sprayed upon a lifted and falling bed of preformed calcium hypochlorite granules. As the granules progressed through the rotary spray grainer, hot gases were passed through the granules to evaporate the aqueous component of the calcium hypochlorite slurry and form a layer of solid calcium hypochlorite on the previously formed granules of calcium hypochlorite in the falling bed. Granular calcium hypochlorite product was removed from the spray grainer at the rate of about 132.33 parts per hour. The granules contained about 49.6 percent calcium hypochlorite, 21.72 percent sodium chloride and about 25.5 percent water. The resulting granules were conveyed to a rotary dryer to remove additional water and to yield approximately 100 parts per hour of granular calcium hypochlorite containing 65.0 percent calcium hypochlorite and about 1.53 percent water.

EXAMPLE 7

A procedure similar to Example 6 was employed to prepare calcium hypochlorite from chlorine, sodium hydroxide and lime except that a single stage reactor was employed in the preparation of gaseous hypochlorous acid and the feed to the reactor was 60 percent caustic rather than 50 percent caustic. The two-stage scrubbing system for producing hypochlorous acid solution and the spray graining technique for preparing calcium hypochlorite of Example 6 were employed in this Example.

Solid sodium hydroxide (46.62 parts per hour) was admixed with recycled wash water (40.02 parts per hour) from the sodium chloride centrifuge to form an aqueous 60 percent sodium hydroxide solution which was fed to the sweep reactor. Fresh chlorine was fed to the sweep reactor at the rate of 58.17 parts per hour along with the recycled chlorine (232 parts per hour) from the top of the second stage scrubber.

An aqueous sodium hypochlorite solution containing suspended sodium chloride was withdrawn from the bottom of the sweep reactor and conveyed to a centrifuge to separate the solid salt. The salt cake was washed with water (29.57 parts per hour) and the resulting wash water containing some dissolved salt was used to mix with solid sodium hydroxide as described above. Wet salt cake containing about 12.2 percent water was removed from the centrifuge at the rate of 55.96 parts per hour.

The clarified aqueous sodium hypochlorite solution (about 36 percent by weight) was removed from the centrifuge at the rate of 51.7 parts per hour, and stored for use in the preparation of calcium hypochlorite. Analysis of the sodium hypochlorite solution was as follows:

| Component | Percent |
|---|---|
| Sodium Hydroxide | 0.89 |
| Water | 54.80 |
| Sodium Chloride | 4.47 |
| Sodium Hypochlorite | 36.00 |
| Sodium Chlorate | 3.90 |

The gaseous mixture from the top of the sweep reactor, which was comprised of unreacted chlorine, hypochlorous acid and chlorine monoxide, was conveyed to the bottom of a first stage scrubber in a two-stage scrubber system at the rate of 260.05 parts per hour. Water was fed to the top of the second stage scrubber at the rate of 101.99 parts per hour. Scrubbed gas from the top of the first stage scrubber was fed to the bottom of the second stage scrubber at the rate of 234.74 parts per hour. Gaseous discharge from the top of the second stage scrubber, which was essentially unreacted chlorine, was recycled to the sweep reactor at the rate of 232.07 parts per hour. Enriched water from the bottom of the second stage scrubber was conveyed at the rate of 104.66 parts per hour to the top of the first stage scrubber. Both scrubbers were maintained at a temperature of approximately 10° C.

An aqueous solution of hypochlorous acid was discharged from the bottom of a first stage scrubber at the rate of 129.29 parts per hour. This solution containing approximately 12.3 percent of hypochlorous acid, the balance being essentially water, was stored in a holding tank for use in the preparation of calcium hypochlorite.

Calcium hypochlorite slurry was formed by reacting sodium hypochlorite solution prepared as described above (51.96 parts per hour), hypochlorous acid solution prepared as described above (129.29 parts per hour), chlorine (16.84 parts per hour) and finely divided lime containing about 96.5 percent by weight of $Ca(OH)_2$ (40.74 parts per hour) in a lime chlorinator. An aqueous slurry containing about 30.2 percent of calcium hypochlorite, about 7.3 percent of sodium chloride and a number of trace impurities was fed at the rate of 238.54 parts per hour to a rotary horizontal spray grainer. In the spray grainer, the calcium hyprochlorite slurry was sprayed upon a lifted and falling bed of preformed calcium hypochlorite granules. As the granules progressed through the rotary spray grainer, hot gases were passed through the granules to evaporate the aqueous component of the calcium hypochlorite slurry and form a layer of solid calcium hypochlorite on the previously formed granules of calcium hypochlorite in the falling bed. Granular calcium hypochlorite product was removed from the spray grainer at the rate of about 126.99 parts per hour. The granules contained about 55.9 percent calcium hypochlorite, 13.7 percent sodium chloride and 25.5 percent water. The resulting granules were conveyed to a rotary dryer to remove additional water and to yield approximately 100 parts per hour of granular calcium hypochlorite containing 70.0 percent calcium hypochlorite and about 4.93 percent water.

What is desired to be secured by Letters Patent is:

1. A process for preparing hypochlorous acid in a reactor which comprises rapidly passing gaseous chlorine in contact with the surface of an agitated solution of [an alkali metal] *sodium* hydroxide at a temperature below about 50° C.

a. whereby a gaseous phase containing unreacted chlorine, hypochlorous acid, and chlorine monoxide is formed, b. whereby a reaction product of suspended particles of [alkali metal] *sodium* chloride in an aqueous solution of [alkali metal] *sodium* hypochlorite is formed, and c. separating said gaseous phase as it forms.

2. The process of claim 1 wherein said chlorine is passed in contact with said surface at a rate sufficient to provide a residence time in said reactor ranging from about 0.01 to about 5 minutes.

3. The process of claim 1 wherein said chlorine in passed in contact with said surface at a rate sufficient to provide a residence time in said reactor ranging from about 0.1 to about 1 minute.

4. The process of claim 3 wherein the [alkali metal] *sodium* hydroxide concentration is in the range from about 40 to about 70 percent by weight.

5. The process of claim 4 wherein the conversion of said chlorine contacted with the surface of said [alkali metal] *sodium* hydroxide solution ranges from about 1 to about 75 percent per pass.

6. The process of claim 5 wherein the conversion of said chlorine contacted with the surface of said [alkali metal] *sodium* hydroxide solution ranges from about 1 to about 35 percent per pass.

[7. The process of claim 6 wherein said alkali metal hydroxide is selected from the group consisting of sodium hydroxide, potassium hydroxide, lithium hydroxide and mixtures thereof.]

[8. The process of claim 7 wherein said alkali metal hydroxide is sodium hydroxide.]

9. The process of claim 5 wherein said temperature is in the range from about 5° to about 20° C.

10. The process of claim 9 wherein said vaporized hypochlorous acid and chlorine monoxide containing unreacted chlorine, after separating from said surface, is contacted with an aqueous medium to produce an aqueous solution of hypochlorous acid.

11. The process of claim 10 wherein said unreacted chlorine is separated from said aqueous hypochlorous acid and recycled for reaction with additional [alkali metal] *sodium* hydroxide solution.

12. The process of claim 9 wherein said [alkali metal] *sodium* hydroxide solution is reacted with sufficient chlorine to effect conversion of at least about 90 percent by weight of said [alkali metal] *sodium* hydroxide to form an aqueous solution of the corresponding [alkali metal] *sodium* hypochlorite containing suspended therein solid particles of the corresponding [alkali metal *sodium* chloride and separating said [alkali metal *sodium* chloride from said aqueous solution of [alkali metal] *sodium* hypochlorite.

13. The process of claim 12 wherein calcium hypochlorite is prepared by reacting said aqueous [alkali metal] *sodium* hypochlorite solution with said hypochlorous acid solution, lime and chlorine to produce an aqueous slurry of calcium hypochlorite, and dewatering said aqueous slurry to produce granular calcium hypochlorite particles.

14. The process of claim 13 wherein said dewatering is effected by spray drying said aqueous slurry of calcium hypochlorite.

15. The process of claim 13 wherein said dewatering is effected by spray graining said aqueous slurry of calcium hypochlorite.

16. The process of claim 15 wherein said aqueous slurry of calcium hypochlorite is adjusted to a water concentration within the range of from about 45 to about 90 percent by weight of water prior to spray graining.

17. The process of claim 16 wherein the concentration of said aqueous slurry of calcium hypochlorite is adjusted within the range of from about 50 to about 60 percent by weight of water prior to said spray graining.

* * * * *